United States Patent [19]

Witzenburg

[11] 4,323,452

[45] Apr. 6, 1982

[54] PUMPLESS FLOW SYSTEM FOR A CORROSIVE LIQUID

[75] Inventor: Marion J. Witzenburg, Peoria, Ill.

[73] Assignee: Caterpillar Tractor Co., Peoria, Ill.

[21] Appl. No.: 219,310

[22] Filed: Nov. 3, 1980

Related U.S. Application Data

[63] Continuation-in-part of Ser. No. 108,910, Nov. 1, 1979, abandoned.

[51] Int. Cl.³ ........................ B01D 21/26; B01D 53/14

[52] U.S. Cl. ................................. 210/188; 210/195.1; 210/258; 210/259; 210/512.1; 417/123; 417/143

[58] Field of Search ............. 152/355; 210/188, 195.1, 210/196, 258, 259, 512.1; 264/37, 317; 417/122-125, 138, 143; 425/DIG. 12

[56] References Cited

U.S. PATENT DOCUMENTS

| | | | |
|---|---|---|---|
| 204,663 | 6/1878 | Gainey | 210/258 X |
| 832,930 | 10/1906 | Strong | 417/122 |
| 990,085 | 4/1911 | Weber | 417/122 |
| 1,600,505 | 9/1926 | Hunter | 417/122 |
| 2,170,549 | 8/1939 | Clark | 417/143 |
| 2,889,199 | 6/1959 | Osborne et al. | 210/259 X |
| 3,405,648 | 10/1968 | Long | 417/122 |
| 3,552,884 | 1/1971 | Faldi | 417/122 |
| 3,606,921 | 9/1971 | Grawey | 152/355 X |
| 4,036,606 | 7/1977 | Zimmermann et al. | 210/195.1 X |
| 4,132,640 | 1/1979 | Filzmoser | 210/195.1 X |

FOREIGN PATENT DOCUMENTS

| | | | |
|---|---|---|---|
| 858930 | 12/1940 | France | 417/122 |

*Primary Examiner*—Robert H. Spitzer
*Attorney, Agent, or Firm*—Wagner, Stellman, McCord, Wood & Dalton

[57] ABSTRACT

A system for transporting a highly corrosive liquid solely by pressure differential without the need of mechanical pumps for transporting the corrosive liquid. The system includes a source of gas under pressure (78,82) and first and second corrosive liquid reservoirs (22,24) connected in parallel to the source via a valve (80) such that one or the other, but not both, may receive pressurized gas. A valve (20) connects one or the other, but not both concurrently, of the reservoirs to a point of use (10) of the corrosive liquid and is specifically designed for connecting the reservoir receiving the pressurized gas to the point of use. A valve (36) receives corrosive liquid from the point of use and directs the same to one or the other, but not both concurrently, of the reservoirs, and is specifically designed to provide the corrosive liquid to the reservoir not then receiving pressurized gas from the source. Air displaced from the reservoir receiving the corrosive liquid is directed to a scrubber (72) and then returned to the pressurized gas source for subsequent reuse.

9 Claims, 1 Drawing Figure

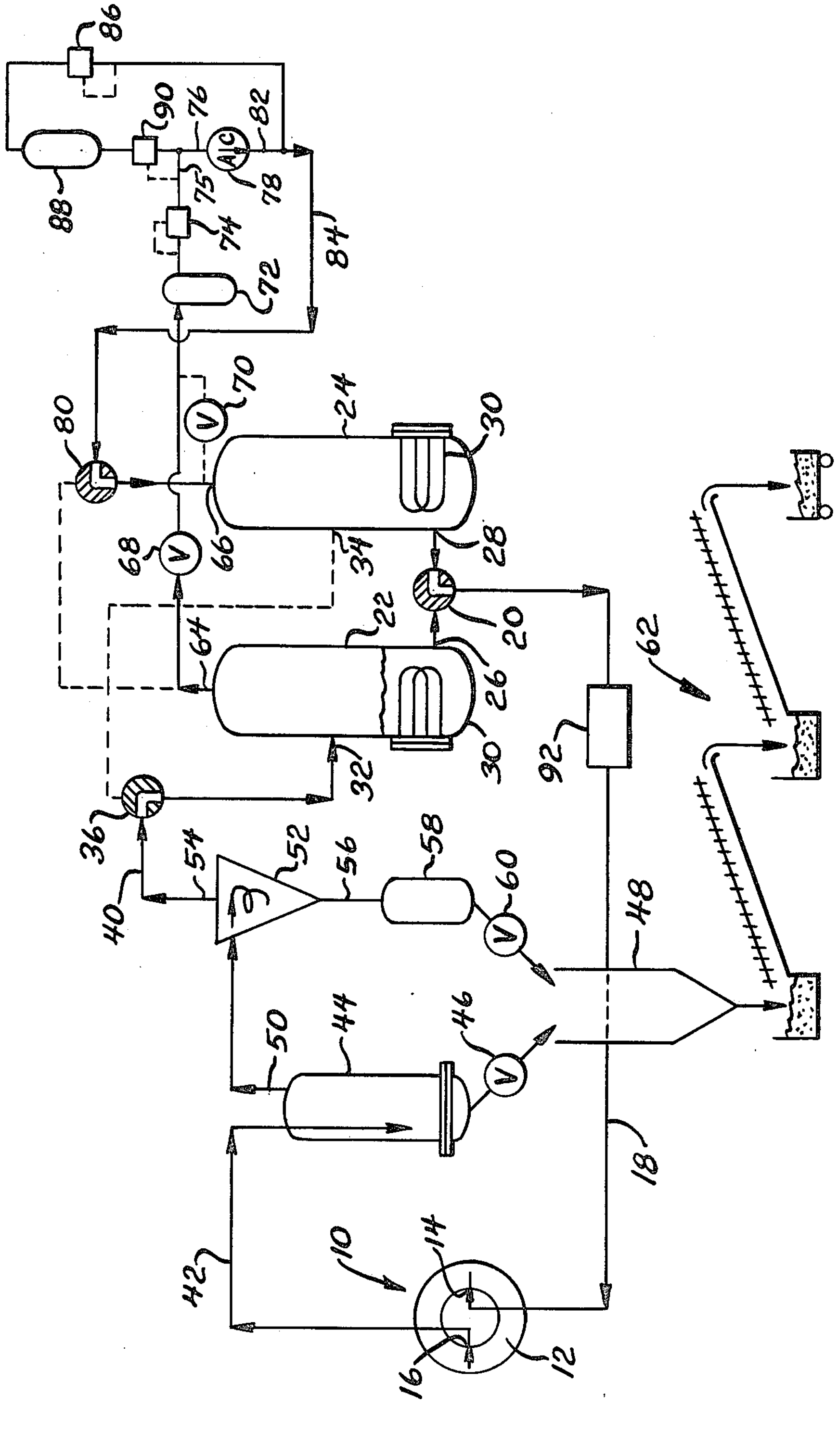

PUMPLESS FLOW SYSTEM FOR A CORROSIVE LIQUID

CROSS REFERENCE

This application is a continuation-in-part of my co-pending application Ser. No. 108,910 filed Nov. 1, 1979, entitled "Pumpless Flow System for a Corrosive Liquid" and assigned to the same assignee as the instant application, now abandoned.

DESCRIPTION

1. Technical Field

This invention relates to the movement of highly corrosive liquids in a flow system without the use of mechanical pumps in contact with the corrosive liquid.

2. Background Art

In U.S. Pat. No. 3,606,921, issued Sept. 21, 1971, to Grawey, there is described a method of fabricating hollow articles having a substantially closed center, namely, a vehicle tire. In the course of forming the tire, a toroidal core structure is employed as a mandrel upon which the tire is built. The core structure is basically a particulate material such as sand. The particulate material is formed to the desired shape and bonded together to hold that shape to thereby form the rigid core. The article, a tire, is then formed on the core and after the article is completed, it is necessary to remove the core from the interior of the article and cure the tire.

Core removal and tire cure have been achieved by flowing a hot caustic solution through the interior of the article. The hot caustic material dissolves the bond holding the grains of the particulate material together and additionally entrains the loosened particulate grains to remove them from the interior of the article in the fluid stream.

Motive force for the corrosive liquid to drive the same through the interior of the article has been provided by mechanical pumps of various types as, for example, centrifugal pumps which, of course, have components in actual contact with the caustic material. Consequently, the corrosive nature of the caustic material rapidly deteriorates seals in the pump or pumps used with the consequence that leaks develop. This is quite undesirable since the system must be taken out of production frequently for seal replacement and, of course, the presence of hot, highly corrosive caustic material, usually under elevated pressure, emanating from leaks in a flow path provides a hostile working environment.

All of the caustic material will be reused after it has washed the particulate core out of an article and cured the tire. To the extent that small quantities of particulate fines may be entrained in the recirculating solution, such fines further increase the wear rate of pump seals and accentuate the problem.

DISCLOSURE OF THE INVENTION

The present invention is directed to overcoming one or more of the problems as set forth above.

According to the present invention there is provided a system for transporting highly corrosive liquid without contacting the liquid with a mechanical pump. The system includes a source of gas under pressure and first and second corrosive liquid reservoirs connected in parallel to the gas source such that one or the other, but not both, may receive pressurized gas therefrom. Means are provided for connecting one or the other, but not both, of the reservoirs to a point of use of the corrosive liquid and specifically, for connecting the reservoir receiving pressurized gas to the point of use. Means are also provided for receiving a mixture of the corrosive liquid, after use, for conveying the corrosive liquid to one or the other, but not both, of the reservoirs, and specifically the reservoir not then receiving pressurized gas from the source.

As a consequence, gas under pressure drives the corrosive liquid from one reservoir to the point of use and then to the other reservoir to be collected and then subsequently driven from that reservoir to the point of use and then to the first mentioned reservoir. No mechanical pumps in contact with the corrosive liquid are required thereby obviating the problems of frequent down time and corrosive liquid leaks.

BRIEF DESCRIPTION OF THE DRAWINGS

The FIGURE is a schematic flow diagram of a corrosive liquid transporting system made according to the invention.

BEST MODE FOR CARRYING OUT THE INVENTION

With reference to the FIGURE, a point of use of a highly corrosive liquid is generally designated 10 and for explanatory purposes may be considered to be a tire 12 made according to the teachings of the previously identified United States Letters Patent to Grawey. Typically then, the corrosive liquid will be a hot caustic solution under pressure which is driven into the interior of the tire via a valve stem shown schematically at 14 and which exits the tire 12 from an opposed valve stem, shown schematically at 16. However, it is to be understood that the system is not limited to use in the formation of tires but may be used wherever the transporting of highly corrosive materials, whether caustic or acidic, in a flow path is required and pump wear and/or leaks is a significant problem. The invention is particularly advantageous where not only is corrosive liquid being moved in a flow path, but where there is a mixture of the corrosive liquid and a particulate material.

Corrosive liquid may be supplied to the point of use via a line 18 which is connectable through a three-way valve 20 to either of two reservoirs 22 and 24, both in form of pressure vessels.

The pressure vessels 22 and 24 have outlets 26 and 28, respectively, connected to the valve 20. The valve 20 is operable, either manually or by means of a control actuator, to direct liquid from the vessel 24 exiting the outlet 28 to the line 18 while sealing the outlet 26 of the vessel 22 or vice versa. In a preferred embodiment of the invention, each of the pressure vessels 22 and 24 is provided with interior heating elements 30 by which the corrosive liquid contained in either may be selectively heated to an elevated temperature.

Each of the vessels 22 and 24 is provided with an inlet, 32 and 34, respectively, and the inlets 32 and 34 are connected in parallel to a three-way valve 36. Corrosive liquid in a line 40 is recovered from the point of use 10 by means to be described in greater detail hereinafter and directed to the valve 36. The valve 36, either manually or automatically, may be conditioned to direct the corrosive liquid to the interior of the vessel 22 via the inlet 32 while blocking the inlet 34 for the pressure vessel 24 or vice versa.

The corrosive liquid directed to the line 40 is received from the point of use 10 via a line 42 connected to the valve stem 16. The line 42 is connected to the inlet of a settling tank 44 which is a sealed pressure vessel and of sufficient size so that liquid velocity therein is minimal. Particulate material from the dissolving core within the tire 12 is entrained in the liquid exiting the tire 12 on the line 42 and enters the settling tank 44 therewith. By gravity, the same settles to the bottom of the settling tank 44. The bottom of the tank 44 is provided with a valved outlet 46 which may be periodically opened to allow accumulated particulate material to exit the vessel 44 into a hopper 48.

The settling tank 44 also includes an upper outlet 50 which is connected to the inlet of a conventional cyclone separator 52. An upper outlet 54 of the cyclone separator is connected to the line 40 while a lower outlet 56 from the cyclone separator 52 is connected to a sealed holding tank 58 which in turn has a valved outlet 60 leading to the hopper 48.

Particulate fines which do not readily separate within the settling tank 44 are separated from the corrosive liquid in the cyclone separator 52 and will settle in a conventional fashion to accumulate in the holding tank 58. They may be periodically removed therefrom through suitable operation of the valved outlet 60.

Separated particulate received in the hopper 48 is then directed to a conventional draining and/or drying system, generally designated 62, to be collected for subsequent reuse or disposal as desired.

Returning to the reservoirs 22 and 24, at the upper ends of each there is provided an inlet-outlet port, 64 and 66, respectively. For the configuration shown in the FIGURE, port 64 on the reservoir 22 is serving a gas outlet function while the port 66 on the reservoir 24 is serving a gas inlet function.

The ports 64 and 66 are connected in parallel via valves 68 and 70, respectively, to the inlet of a conventional gas scrubbing device 72. The outlet of the gas scrubbing device is connected to a low pressure regulator 74 and then to a line 75 to the inlet 76 of an air compressor 78.

The ports 64 and 66 are also connected to a three-way valve 80 which in turn is connected to the outlet 82 of the air compressor 78 by a line 84.

The outlet 82 of the air compressor 78 is connected via a high pressure regulator 86 to a tank 88. The line 75 is also connected to the tank 88 via a pressure regulator 90 which normally will be set at a value just below the setting on the regulator 74. Lastly, a heater 92 may be incorporated in the line 18 in addition to or as an alternate for the heaters 30.

Thus, it will be appreciated that the three-way valve 80 can be adjusted, either manually or automatically, to direct air under pressure from the air compressor 78 to the interior of the pressure vessel 24 as shown while blocking the port 64 of the pressure vessel 22 or vice versa. It will be appreciated from the foregoing description that the entire system is sealed save for the regulatable outlets for the particulate materials, namely, the valved outlets 46 and 80. The described system is a closed system and during the operational cycle no gas enters or leaves the system. Thus, the mass of gas in the system remains constant but the volume ratio of high to low pressure gas changes as the liquid level changes in the vessels 22 and 24. The tank 88 serves as a reservoir for that mass of gas not active in the system during part of the cycle, and either receives gas from the pressure regulator 86, when pressure is higher than required in line 84, or expels gas through the pressure regulator 90 when the pressure in the line 75 is less than that controlled by the pressure regulator 74. The pressure regulator 74 may be set at any desired pressure so long as it is lower than the pressure setting on the regulator 86 so that a pressure differential will exist for flow purposes as will be seen. This is particularly desirable where the corrosive liquid is to be heated by the heaters 30 to a temperature in excess of its boiling point at atmospheric pressure. The minimum system pressure can be set on the regulator 74 at a sufficiently high level so as to prevent the occurrence of boiling of the corrosive liquid anywhere within the system.

Though not shown herein, it is generally desirable to provide a venting valve in the line 42 whereby the interior of the tire 12 can be vented to atmosphere at the conclusion of the core removal process. Such a valve allows any residual pressure remaining in the tire 12 to be vented to atmosphere prior to removal of the tire 12 from the flow system to avoid any pressurized discharge of gas or caustic solution when the system connections at the valve stems 14 and 16 are removed.

In some cases, it may be desirable to provide for a connection of the line 18 to a high pressure air source as by a valve that simultaneously prevents flow in the line 18 from the heater 92 and introduces pressurized air into the tire through the valve stem 14. The purpose of such a construction is to flush any corrosive liquid remaining within the interior of the tire 12 as well as any residual core material therein, out of the tire 12 at the conclusion of corrosive liquid circulation and prior to removal of the tire from the system. Any such material flushed by the high pressure air will exit on the line 42 to the settling tank 44.

Finally, a further high pressure air inlet to the system may be provided between the outlet of the air compressor 78 and the pressure regulator 86 for the purpose of initially charging the system with a sufficient volume of air so as to enable closed loop operation thereafter, as will be seen.

INDUSTRIAL APPLICABILITY

Operation of the system is as follows. Assuming the three-way valves 20, 36 and 80 are in the positions illustrated in the FIGURE, the valve 70 will be closed while the valve 68 will be opened. Typically, the valved outlets 46 and 60 will be closed, although they may be periodically opened when a predetermined particulate level in either the settling tank 44 or the holding tank 58 has been reached, to bring the particulate level down to some predetermined minimum. Compressed air from the air compressor 78 will be provided at a relatively high pressure to the line 84. The high gaseous pressure will be applied via the line 84, the three-way valve 80, and the port 66 to the interior of the pressure vessel 24. Heated, highly corrosive caustic will be driven from the pressure vessel 24 via the valve 20 and the line 18 to the inlet 14 for the tire 12. The hot caustic will dissolve or loosen the bond between the particulate material in the core of the tire 12 and a mixture of corrosive liquid and particulate will exit the tire 12 via the valve stem 16 on the line 42. From there, the mixture will enter the settling tank 44 wherein the vast majority of the particulate will settle out. The corrosive liquid, containing a small amount of particulate fines, will then exit the settling tank 44 via the outlet 50 to enter the cyclone separator 52 in which the fines will be separated from the corrosive liquid. The fully separated corrosive liquid will exit the outlet 54 of the cyclone separator and on the line 40 be directed by the three-way valve 36 to the inlet 32 of the reservoir 22. Since the outlet 26 of the reservoir 22 is closed by the valve 20, air within the pressure vessel 22 will be displaced by the incoming corrosive liquid and will exit the vessel 22 via the port 64. The air will pass through the open valve 68 to the scrubber 72 which will remove any fine droplets or vapor from the corrosive liquid. It will then pass at the pressure determined by the pressure regulator 74 to the line 75 and the inlet 76 for the compressor 78 to have its pressure elevated for recycling.

The vessels 22 and 24 can be suitably sized so that they will contain a sufficient amount of corrosive liquid as to fully dissolve the core and completely cure the largest tire 12 for which the system is intended. Thus, once the reservoir 24 has been exhausted of corrosive liquid, the valve 20 may be suitably operated so as to close off both of the outlets 26 and 28 or the vessels 22 and 24 and the tire 12 removed and another tire with core intact replaced therein. During the preceding operation, the corrosive liquid that has been accumulated in the vessel 22 can be heated. Assuming that it has been sufficiently heated, the valve 20 may then be operated so as to connect the outlet 26 of the vessel 22 to the line 18 while blocking the outlet 28 of the vessel 24. The valve 68 will then be closed while the valve 70 will be opened. Additionally, the valve 36 will be manipulated so as to direct recovered corrosive liquid incoming on the line 40 to the vessel 24 via its inlet 34. Finally, the valve 80 will be adjusted so as to direct air under elevated pressure incoming on the line 84 from the compressor 78 to the port 64 for the vessel 22. As a consequence, the recovered caustic will be driven therefrom and through the newly placed tire 12 at the point of use 10. During this subsequent operation, recovered corrosive liquid will replenish the vessel 24 and air driven therefrom will be scrubbed by the scrubber 72 and recompressed by the compressor 78 until the cycle is completed. At this time, a new tire with core intact is placed at the point of use 10 and suitably connected to the lines 18 and 42, and the operation repeated using corrosive liquid from the vessel 24.

Alternately, where the vessels 22 and 24 are of lesser size and each one containing an insufficient quantity of corrosive liquid to complete a core washout and cure cycle, the system may be operated in the same fashion described above until either the vessel 22 or the vessel 24 is nearly empty and the receiving vessel 24 or 22 very nearly full. At this time, flow is stopped by placing both valves 68 and 70 in an open condition thereby allowing gas pressure in the vessels 22 and 24 to equalize. Valves 20, 36 and 80 are then switched and one or the other of the valves 68 and 70 closed to cause the liquid to flow from the nearly full one of the vessels 22 and 24 as soon as the air compressor 78 has established an adequate pressure differential.

Of considerable significance in the foregoing is the fact that the system provides uniform flow in a closed loop throughout the core removal and/or curing process. By way of example, and for the settings of the valves 36 and 80 as shown in the FIGURE, at the beginning of the flow cycle the vessel 22 would contain, for example, 210 cubic feet of air at 300 psi while the vessel 24, being principally filled with corrosive liquid might contain 10 cubic feet of air at 400 psi to provide a 100 psi pressure differential to cause liquid flow. At the end of the flow cycle, the vessel 22, having been filled with the liquid, would contain 10 cubic feet of air at 300 psi while the tank 24, now substantially empty, would contain 210 cubic feet of air at 400 psi.

It would thus be appreciated that some additional mass of air must be added to the loop to increase the pressure of 200 cubic feet of air by 100 psi. Such additional air is obtained from the tank 88 as required.

The supply of the additional air which provides uniform flow throughout the cycle is controlled by the unique arrangement of the pressure regulating valves 74, 86 and 90. For a cycle utilizing a pressure differential of 100 psi and a low pressure of 300 psi with a high pressure of 400 psi, the valve 74 would be set to open at 300 psi so that as the volume of liquid in the vessel 22 increases, the resultant pressure build-up will cause the valve 74 to open to supply air to the inlet of the compressor 78. However, as will be apparent, the mass of air thus received will be insufficient to provide the same volume of air at the higher pressure.

Thus, the pressure regulator 90, which opens in response to sensed pressure in the line 76 as shown in the drawing, would be set at, for example, 295 psi. When there is insufficient air at the inlet of the compressor 78 to supply the system needs, the pressure in the line 75 will begin to drop. When it drops below the setting of the regulator 90, the compressor 78 will not only receive inlet air from the regulator 74, but from the tank 88 through the regulator 90 as well, the latter allowing sufficient flow of air to meet system needs. This will occur throughout the flow cycle insuring that the compressor 78 has sufficient air at its inlet to generate the desired output pressure, here 400 psi.

When, during system operation, the air pressure at the outlet of the compressor 78 on line 82 exceeds the maximum desired system pressure, the regulator 86 which is set at such maximum pressure, here 400 psi, opens to allow the excess volume of air to flow into the tank 88 thereby maintaining maximum pressure at 400 psi while increasing the air supply in the tank 88.

Thus, it can be seen that the minimum system pressure is maintained uniformly throughout the cycle through action of the regulator 74 while the regulator 86 uniformly maintains maximum system pressure. The regulator 90 opens as is required to provide sufficient additional air to the compressor 78 to enable it to maintain the desired maximum system pressure at its outlet. And since the pressures are uniformly maintained, substantially uniform flow will occur throughout the process.

From the foregoing, it will be appreciated that flow of the corrosive liquid is accomplished entirely through the use of pressure differentials established by suitable adjustment of the pressure regulators 74, 86 and 90 and that mechanical pumps are not required in the system. As a result, rapid seal deterioration and associated down time and corrosive liquid leaks found in the prior art system are entirely avoided. Efficiency of the operation is therefore greatly enhanced and the troublesome pump leaks at seals therein completely eliminated to provide a more desirable working environment.

In addition, the system can be applied to the vulcanization mode, concurrently with the removal of the particulate core, without the necessity of carcass molds.

I claim:

1. A closed loop high pressure fluid flow system for transporting a mixture of a highly corrosive liquid and a particulate material and separating the latter from the former while recovering the corrosive liquid and not requiring mechanical pumps comprising:

a source (78,82) of high pressure gas under pressure;

first and second corrosive liquid reservoirs (22,24) connected in parallel (64,66,80,84) to said source, said source comprising a compressor (78) having an outlet (82) connectable to one or the other, but not both concurrently, of said reservoirs and an inlet (76) connectable to one or the other, but not both concurrently, of said reservoirs, and specifically the reservoir not then connected to said outlet, and gas supply regulating means comprising a gas storage tank, a low pressure regulator connecting the gas storage tank to said compressor inlet, and a high pressure regulator connecting the gas storage tank to said compressor outlet;

means (20) for connecting one or the other, but not both concurrently, of said reservoirs to a point of use (10) of the corrosive liquid and specifically, for connecting the reservoir receiving pressurized gas to said point of use;

means (44,52) for receiving a mixture of the corrosive liquid, after use, and particulate material and for separating the mixture into its components of particulate material and corrosive liquid; and means (36) for conveying the separated corrosive liquid to one or the other, but not both concurrently, of the reservoirs, and specifically the reservoir not then receiving pressurized gas from the source.

2. The system of claim 1 further including a scrubber (72) and a pressure regulator (74) in series with each other and with said inlet and said reservoirs.

3. The system of claim 2 wherein said receiving and separating means comprise a settling tank (44) and a cyclone separator (52), said settling tank being upstream of said cyclone separator, and selectively operable means (46,60) for withdrawing particulate material therefrom.

4. A closed loop system for transporting a mixture of a highly corrosive liquid and a particulate material and separating the latter from the former while recovering the corrosive liquid and not requiring mechanical pumps comprising:

an air compressor (78) having an inlet (76) for receiving air under a relatively low pressure and an outlet (82) for providing air under relatively high pressure;

an air scrubber (72) connected to said inlet;

a storage tank (88) connected between said inlet and said outlet;

means for directing high pressure air from said outlet to said storage tank when the pressure exceeds the desired operating pressure of the liquid transport system;

means for directing air from said storage tank to said compressor inlet when the pressure at the inlet drops below a preselected minimum suction pressure;

first and second pressure vessels (22,24) each having an inlet (32,34), and outlet (26,26), and an inlet-outlet port (64,66);

first valve (68,70,80) means for cross connecting said air compressor outlet and said scrubber with said vessel ports;

second valve (20) means for connecting one or the other of said vessel outlets, but not both concurrently, to a point of use (10) of corrosive liquid; and third valve means (36) for receiving a corrosive liquid downstream from said point of use and directing the corrosive liquid to one or the other of said vessel inlets, but not both concurrently, whereby air under relatively high pressure from said compressor may alternately be directed by said first valve means to (a) one of said pressure vessels to drive corrosive liquid therefrom via said second valve means to said point of use and thence via said third valve means to the other of said pressure vessels with air displaced from said other pressure vessel by said corrosive liquid being conveyed to said compressor inlet via said first valve means and said scrubber, or (b) the other of said pressure vessels to drive corrosive liquid therefrom via said second valve means to said point of use and thence via said third valve means to said one vessel with air displaced therefrom by said corrosive liquid being conveyed to said compressor inlet via said first valve means and said scrubber.

5. The system of claim 4 further including a low pressure regulator (74) interconnecting said scrubber and said compressor inlet, and heating means (30) for heating corrosive liquid in said system.

6. The system of claim 4 further including separating means (44,52) upstream of said third valve means and downstream of said point of use for separating foreign material from said corrosive liquid prior to receipt of the corrosive liquid by said third valve means.

7. A closed loop system for transporting a mixture of a highly corrosive liquid and a particulate material and separating the latter from the former while recovering the corrosive liquid and not requiring mechanical pumps comprising:

an air compressor (78) having an inlet (76) for receiving air under a relatively low pressure and an outlet (82) for providing air under relatively high pressure;

a storage tank (88) interconnecting said inlet and said outlet;

means (86) between said outlet (82) and said tank (88) for selectively allowing excessively high pressure air to flow from said outlet (82) to said tank (88);

means (90) between said inlet (76) and said tank (88) for controlling the flow of air from said tank to said inlet (76);

first and second pressure vessels (22,24) connected in parallel (64,66,80,84) to said outlet (82) such that one or the other, but not both concurrently, may receive pressurized air therefrom;

means (20) for connecting one or the other, but not both concurrently, of said vessels (22,24) to a point of use (10) of the corrosive liquid and specifically, for connecting the vessel receiving pressurized air to said point of use (10);

means (44,52) for receiving a mixture of the corrosive liquid, after use, and particulate material and for separating the mixture into its components of particulate material and corrosive liquid;

means (36) for conveying the separated corrosive liquid to one or the other, but not both concurrently, of the vessels (22,24), and specifically the vessel not then receiving pressurized air from the outlet (82);

means (68,70) for connecting one or the other of said vessels (22,24) to said inlet (76) and specifically, for connecting the vessel not receiving pressurized air to said inlet; and means (74,75) between said inlet connecting means (68,70) and said inlet (76) for regulating the pressure of air flowing from the vessel not receiving pressurized air to said inlet (76).

8. The system of claim 7 wherein said means between said outlet and said tank comprise a high pressure regulator, said means between said tank and said inlet comprises a first low pressure regulator, and said means between said inlet connecting means and said inlet comprise a second low pressure regulator.

9. The system of claim 8 wherein said first low pressure regulator is connected to open when the pressure at said inlet falls below the regulating pressure setting of said second low pressure regulator to supply additional air to said compressor inlet under such low suction pressure conditions.

* * * * *